W. L. FRIEDMAN.
RECORDING INSTRUMENT.
APPLICATION FILED OCT. 6, 1913.
1,204,558.
Patented Nov. 14, 1916.
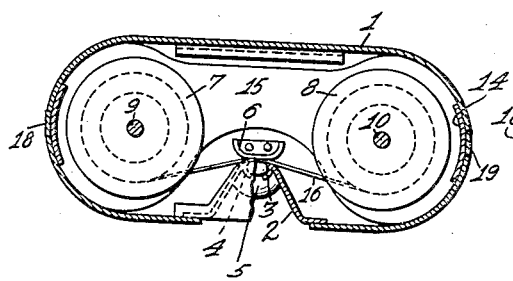
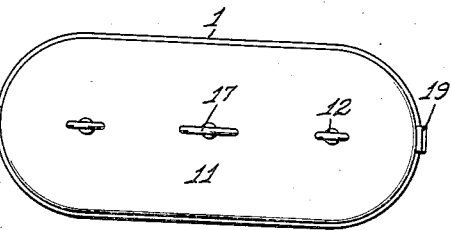
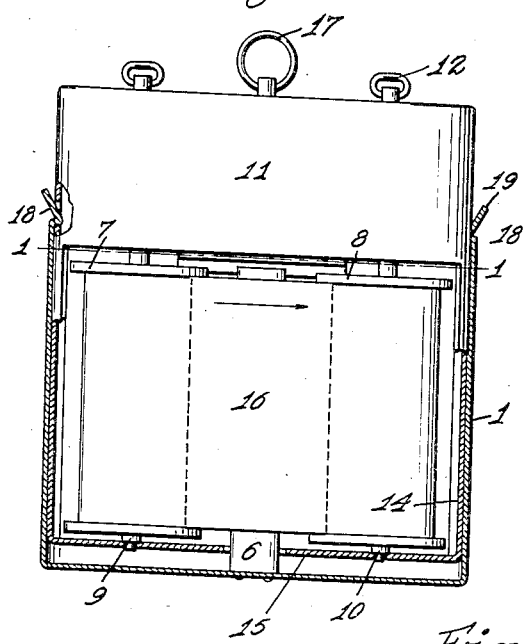
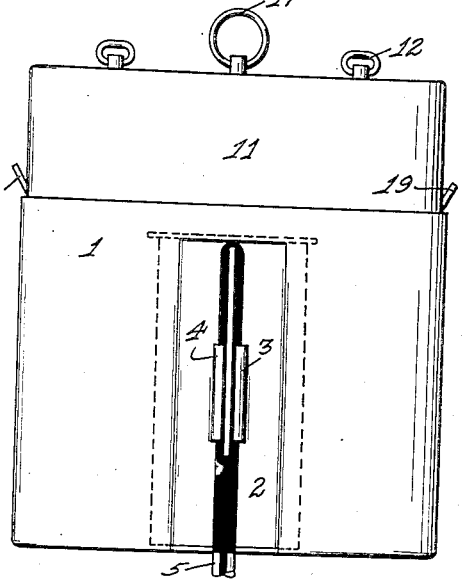
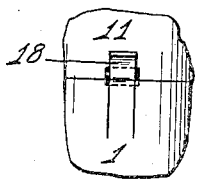
WITNESSES:
F. A. Linney
A. H. Kephart
INVENTOR.
W. L. FRIEDMAN
BY
Carlos P. Griffin
ATTORNEY.

UNITED STATES PATENT OFFICE.

WILLIAM L. FRIEDMAN, OF OAKLAND, CALIFORNIA.

RECORDING INSTRUMENT.

1,204,558.      Specification of Letters Patent.      Patented Nov. 14, 1916.

Application filed October 6, 1913. Serial No. 793,783.

*To all whom it may concern:*

Be it known that I, WILLIAM L. FRIEDMAN, a citizen of the United States, residing at Oakland, in the county of Alameda and State of California, have invented a new and useful Recording Instrument, of which the following is a specification in such full and clear terms as will enable those skilled in the art to construct and use the same.

This invention relates to a recording instrument for producing a record upon a strip of sensitized paper of the movement of an indicating column, such for example, as is contained in a thermometer.

An object of the invention is to produce a compact recording instrument which can be easily carried in the pocket and used wherever desired.

Another object of the invention is to provide means whereby the recording instrument may be charged and recharged with the sensitized strip of paper at will.

An embodiment of the invention is shown in the drawing in which the same reference numeral is applied to the same portion throughout, but I am aware that there are many modifications thereof.

Figure 1 is a horizontal sectional view through the recording instrument on the line 1—1 Fig. 3, Fig. 2 is a plan view of the complete instrument, Fig. 3 is a front elevation of the instrument with the front portion of the thermometer holding the casing broken away, Fig. 4 is a front elevation of the complete instrument, and Fig. 5 is a side elevation of one of the catches which holds the two portions of the instrument together.

It will be understood by those skilled in the art that while a thermometer has been shown that any instrument which would vary the length of the paper strip exposed to the light might be used in the place of the thermometer.

The numeral 1 is applied to the casing of the instrument, said casing being oblong in shape and having its ends rounded as shown in the plan view. In the side of this casing there is an opening produced in which a V-shaped trough 2 is secured. Within this V-shaped trough clips 3 and 4 are formed in the bottom thereof, which clips hold the thermometer 5 in place.

The thermometer tube is flattened as indicated in Fig. 4 and has its sides blackened to prevent the light from passing to the sensitized paper strip except through that portion of the bead tube 2 which is unfilled with mercury. In back of the trough there is a platen strip 6 secured to the bottom of the casing 1 and extending upwardly therefrom adjacent the thermometer tube.

The sensitized paper strip is wound upon spools 7 and 8, which spools are frictionally supported upon shafts 9 and 10. These shafts extend through the casing 11 within which is installed a suitable clock movement to cause one of the spools to pull the paper from the other one at a fixed rate, but which clock movement forms no part of the present invention. This clock movement is wound by turning the key 12, and whenever necessary the relative position of the two spools may be changed one with respect to the other by forcibly turning the spools upon their respective shafts.

The lower portion of the casing 11 fits within the casing 1 as indicated at 14, and it is provided with a bottom portion 15 which affords a bearing for each of the shafts 9 and 10.

When the device is to be assembled for use a strip of paper 16 is wound upon the spools and then the spools and casing carrying them are inserted within the casing 1, the paper strip 16 being slid between the platen and thermometer.

The device may be conveniently carried by means of a suitable ring 17 secured to the casing 11 and the two casings are secured together by means of two snaps 18 and 19 on the upper portion of the casing 1.

The operation is as follows: The casing is charged with sensitized paper and the thermometer bulb is placed in contact with the body whose temperature is sought to be recorded with the thermometer exposed to the light. As the temperature of the body changes there will be changes in the height of the mercury column, the mercury filling the narrow unblackened portion of the thermometer tube through which the light can pass to the paper strip. As the mercury rises and falls or remains stationary a record will be made on the paper strip by the light, which paper strip is pulled under the thermometer at a uniform rate by the operating mechanism.

Having thus described my invention what I claim as new and desire to secure by Letters Patent of the United States is as fol- lows, modifications within the scope of the claims being expressly reserved:

1. In a recording instrument, an elongated casing, a platen therein, a shallow trough in the front of said casing, a registering instrument in the bottom of said trough adjacent the platen having a narrow band through which light may variably pass with changed conditions of the instrument, a secondary casing connected to the first casing, shafts carried by said secondary casing, spools frictionally carried by said shafts for supporting a sensitized paper strip, means to rotate one of said spools at a predetermined rate, and means to secure the two casings together.

2. In a recording instrument, an elongated casing, a platen secured to the bottom thereof, a slitted trough adjacent the platen, a thermometer with its sides non-actinic and with a clear strip over its bead tube in the trough, and projecting below the casing supporting it, a second casing connected to the first casing, spools carried by the second casing and capable of drawing a paper under the trough and strip over the platen, mechanical means to operate one of said spools to move the paper strip at a determinate rate, and spring hooks to hold the two casings together.

In testimony whereof I have hereunto set my hand this 16th day of September, A. D. 1913, in the presence of the two subscribed witnesses.

WILLIAM L. FRIEDMAN.

Witnesses:
  A. E. CURRAN,
  WM. B. WEST.